Sept. 9, 1924.  
L. S. WELLS  
ELECTRIC HEATER  
Filed March 22, 1922  
1,507,901
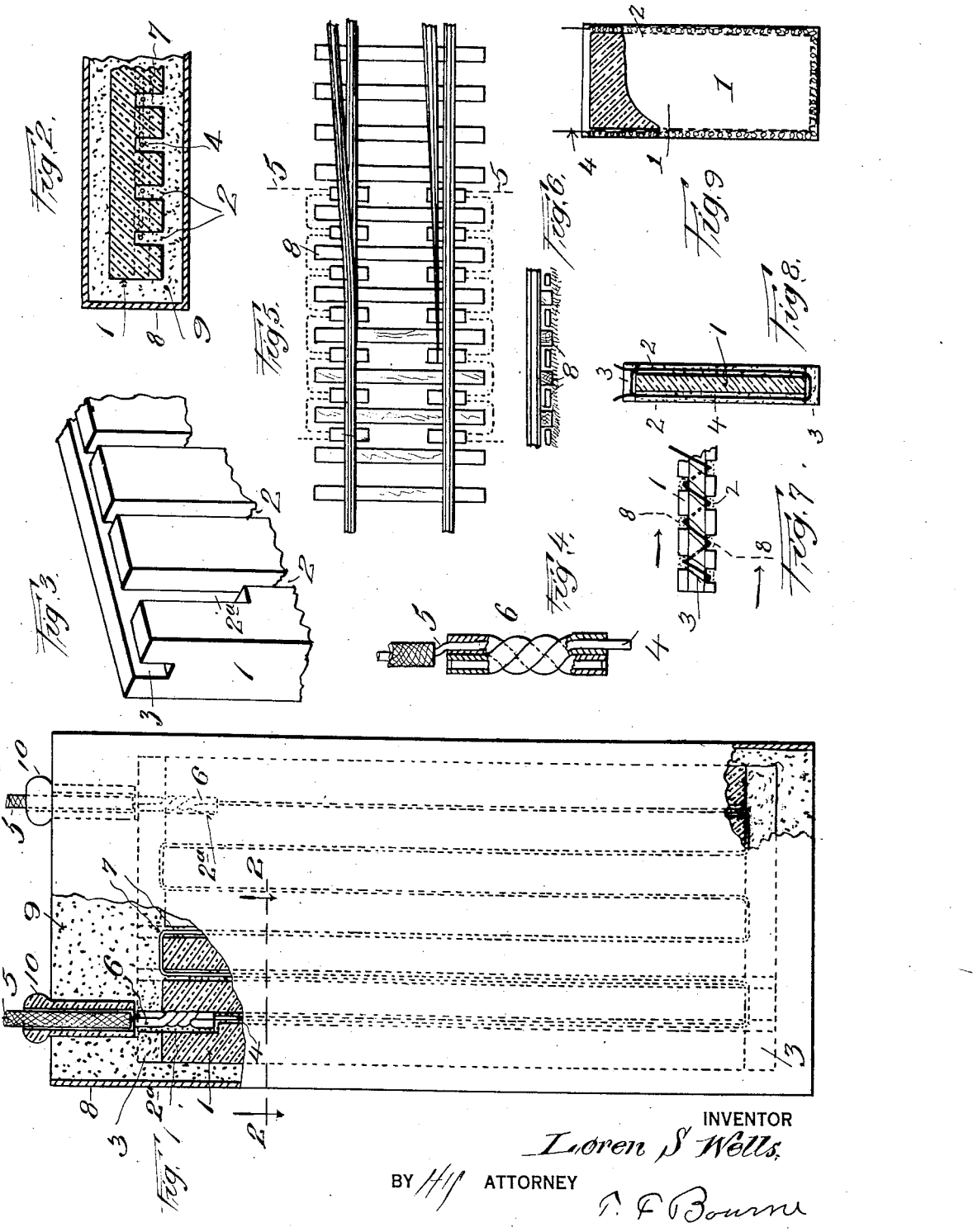
INVENTOR  
Loren S Wells  
BY  /H/  ATTORNEY  
T. F. Bourne Patented Sept. 9, 1924.

1,507,901

UNITED STATES PATENT OFFICE.

LOREN S. WELLS, OF NEW YORK, N. Y.

ELECTRIC HEATER.

Application filed March 22, 1922. Serial No. 545,634.

*To all whom it may concern:*

Be it known that I, LOREN S. WELLS, a citizen of the United States, and resident of New York city, borough of Manhattan, in the county of New York and State of New York, have invented certain new and useful Improvements in Electric Heaters, of which the following is a specification.

The object of my invention is to provide a heater to be heated by electric current, which shall be strong and durable, for some uses adapted to withstand outdoor weather conditions, and while adapted for various heating purposes is particularly adapted for use in connection with switches of railway tracks to keep snow and ice from accumulating at the switches, the heater preferably having heat storage characteristics to permit of the partial retention and gradual diffusion to the atmosphere of heat after the electric current is shut off.

In carrying out my invention I provide a body of insulating material, which will be a high conductor of heat and not affected injuriously by temperature changes or other atmospheric or weather conditions, within which body a resistance conductor is located and which may be buried and concealed within said body against water, moisture, snow and ice. In the example of my invention illustrated in the accompanying drawings I provide the aforesaid body preferably of soapstone, in which spaced grooves are provided in which grooves a suitable resistance conductor is located, a protecting material for the conductor being filled in said grooves to embed or encase the conductor therein for some purposes, as where the heater is exposed to the elements, the ends of the resistance conductor being suitably connected to line conductors or leads of an electric circuit. The connections between said conductors may be protected by means of suitable cement or other suitable protecting material of an insulating character, which parts, for some purposes, are preferably enclosed within a protecting container.

My invention also comprises novel details of improvement that will be more fully hereinafter set forth, and then pointed out in the claims.

Reference is to be had to the accompanying drawings, forming part hereof wherein—

Figure 1 is a partly broken face view of an electric heater embodying my invention;

Fig. 2 is a section on line 2, 2, in Fig. 1;

Fig. 3 is a fragmentary perspective view of an insulating heater body;

Fig. 4 is a sectional detail showing connecting means between the resistance conductor and the line conductor;

Fig. 5 is a plan view illustrating my improved heater located at a railway switch;

Fig. 6 is an edge view part of Fig. 5;

Fig. 7 is a detail edge view of a modified heater;

Fig. 8 is a section on line 8, 8, in Fig. 7, and

Fig. 9 is a partly sectional side view of another modification.

Similar numerals of reference indicate corresponding parts in the several views.

The insulating heat conducting body is indicated at 1, which may be made of soapstone, asbestos or other suitable analogous material adapted to be heated without injury, which body is shown provided with a series of grooves 2. In Figs. 1, 2, and 3 spaced grooves 2 are longitudinally disposed in one side of the body, and at the ends of the body transverse grooves 3 are provided, which communicate with the corresponding ends of the longitudinal grooves 2. A resistance wire 4 is laid in the grooves 2 and 3, being shown extending through one groove 2, thence through groove 3 to the next groove 2 at one end of the body, thence through said groove 2 to the groove 3 at the opposite end of the body, thence to the adjacent groove 2, and so on through said grooves. In Figs. 7 and 8 the spaced grooves 2 alternate on opposite sides of body 1 and the grooves 3 extend diagonally between adjacent grooves 2 at the ends of the body, the conductor 4 passing through the grooves 2 and 3 along the sides and around the ends of the body. In Fig. 9 the grooves 2 are in the edges of the body 1. The conductor 4 may be straight, or may be coiled as shown in Fig. 9. The free ends of the resistance wire in Fig. 1 are connected with line conductors 5 of an electric service system. I have shown the ends of conductors 4 and 5 connected by the double-barrel connector 6 which receives the respective ends of said conductors and is twisted to retain said conductors in electrical and mechanical connection. The grooves 2 of member 1, within which the connection is made between the conductors, are shown enlarged or widened at 2ª to receive the connection points between the conductors 4, 5, such as the connectors 6. The ends of the conductor 4, in Figs. 7, 8 and 9, may be connected to the line conductors in the manner before stated, or in any desired way. After the conductors 4 have been laid in the grooves 2, 3 of member 1 said grooves may be filled with an insulating preferably waterproof heat resisting material 7, which may comprise or consist of cement, carborundum refractory cement, asbestos, or the like, whereby the conductors are permanently secured in the grooves of member 1 and are protected against water, moisture, snow and ice. The filling described, when placed in the grooves of member 1, will unite therewith and with the resistance conductor in the grooves in such a way as to form a solid unit of such parts not liable to injury.

My improved heater may be used in various relations. When used in extremely exposed locations, such as adjacent to railway tracks and switches, such as illustrated in Figs. 5 and 6, I preferably enclose the heater in an insulating preferably refractory covering 9, which may be enclosed in a container 8, which may be in the form of a metal container having one or both ends open. After the heater has been placed in the container with the conductors 5 extending from the heater into the adjacent open end of the container, the latter is charged with a suitable insulating heat conducting material, such as cement, asbestos, asbestos compound, clay or the like, as a high conductor of heat, indicated at 9, whereby the entire heater is embedded within the container in such cement, as well as the portions of the conductor 5 that are within the container. By preference I apply insulators 10 upon the conductors 5 at their portions within the open end of the container 8 to be buried in the cement or the like 9, as indicated in Fig. 1, said insulators being applied to conductors 5 preferably before the cement or the like is poured into the container. After the cement 9 has hardened and set within the container said cement will retain the heater securely and immovably within the container, whereby such parts will all form a solid unit, not liable to injury in transportation and use. For some uses the heater and its conductors may be enclosed in the material 9 and the container 8 omitted.

When the electric current is passed through the resistance conductor 4 of the heater, the body 1 will become heated without injury to any of the parts, and when the heater is buried in the enclosing cement 9, and the container 8 the latter will also become heated to a degree desired, according to the character of the resistance conductor, the dimensions of the parts, and the amount of current used. When my improved heaters are placed beneath the rails and between the cross ties of a railway track, the snow that would accumulate at such place will be melted, and ice and sleet will be prevented from forming on the rails, switches, and other parts of the tracks adjacent to the heaters. The heaters may be used singly, or in series or multiple in an electric circuit, according to requirements.

My improved heater may be made of various forms and sizes according to the uses intended, since it may be adapted for interior heating, such as within railway cars and in other places and instruments, where it is convenient to use the electrical current for heating purposes.

Having now described my invention, what I claim is:

1. An electric heater comprising a refractory heat conducting body provided with grooves, and a resistance conductor within said grooves, a portion of two of said grooves being enlarged, connectors within the grooves joining line conductors to the ends of said resistance conductor, the junction of said line conductors with said resistance conductor beng located within said enlarged part of said grooves, a container for said body, insulators for the line conductors, and a closure at the end of the container receiving the insulators.

2. An electric heater comprising a refractory heat conducting body provided with grooves, a resistance conductor within said grooves, a container enclosing said heater, an insulating heat conductor filling within said container embedding said heater therein, and insulators extending within the container for line terminals.

3. An electric heater comprising a refractory heat conducting body provided with grooves, a resistance conductor within said grooves, a container enclosing said heater, and cement within said container embedding said heater therein, line conductors extending within the container and connected with said resistance conductor, and insulators upon portions of the line conductors within said container, said insualtors having portions embedded within said filler within the container.

Signed at New York city, in the county of New York, and State of New York, this 20th day of March, A. D. 1922.

LOREN S. WELLS.